(12) United States Patent
Sekine

(10) Patent No.: US 7,511,888 B2
(45) Date of Patent: Mar. 31, 2009

(54) PROJECTION OPTICAL SYSTEM, EXPOSURE APPARATUS, DEVICE MANUFACTURING METHOD, AND DEVICE MANUFACTURED BY USING THE SAME

(75) Inventor: Yoshiyuki Sekine, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/139,337

(22) Filed: May 26, 2005

(65) Prior Publication Data

US 2005/0270648 A1     Dec. 8, 2005

(30) Foreign Application Priority Data

May 26, 2004     (JP)     .............................. 2004-156362

(51) Int. Cl.
    *G02B 1/10*     (2006.01)
(52) U.S. Cl. ........................ 359/584; 359/580; 359/590
(58) Field of Classification Search ................. 359/584, 359/580, 590
    See application file for complete search history.

(56) References Cited

U.S. PATENT DOCUMENTS

| | | | |
|---|---|---|---|
| 6,188,513 B1 | 2/2001 | Hudyma et al. | |
| 6,738,188 B2 * | 5/2004 | Singh | 359/359 |
| 7,162,009 B2 * | 1/2007 | Kanazawa et al. | 378/84 |
| 2006/0245057 A1 * | 11/2006 | Van Herpen et al. | 359/587 |

FOREIGN PATENT DOCUMENTS

JP     2003-177319     6/2003

OTHER PUBLICATIONS

Kuhlman et al., "Design and Fabrication of broadband EUV multilayer mirrors", Proc SPIE, vol. 4688 (2002) pp. 509-515.

* cited by examiner

*Primary Examiner*—Joshua L Pritchett
(74) *Attorney, Agent, or Firm*—Locke Lord Bissell & Liddell, LLP

(57) ABSTRACT

A projection optical system having a multilayered film mirror arranged to provide an approximately uniform reflectance throughout a predetermined light incidence angle range to thereby assure a desired optical performance. A projection exposure apparatus having such a projection optical system, and a device manufacturing method using such an exposure apparatus. A non-periodic film is used in a reflection multi-layered film upon a mirror having a largest light incidence angle range or a mirror having a largest average of light incidence angle, and this effectively reduces a pupil transmittance distribution in the projection optical system.

16 Claims, 12 Drawing Sheets

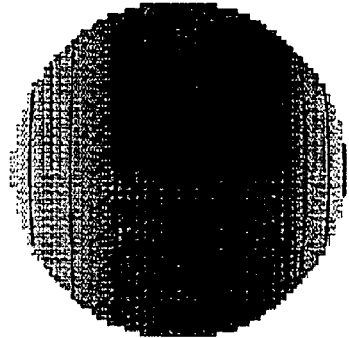
FIG.3A
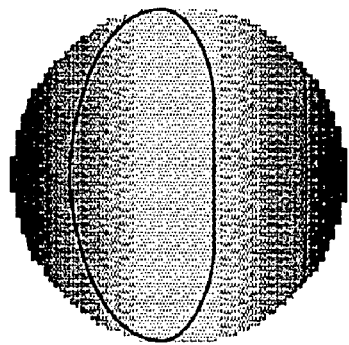
FIG.3B
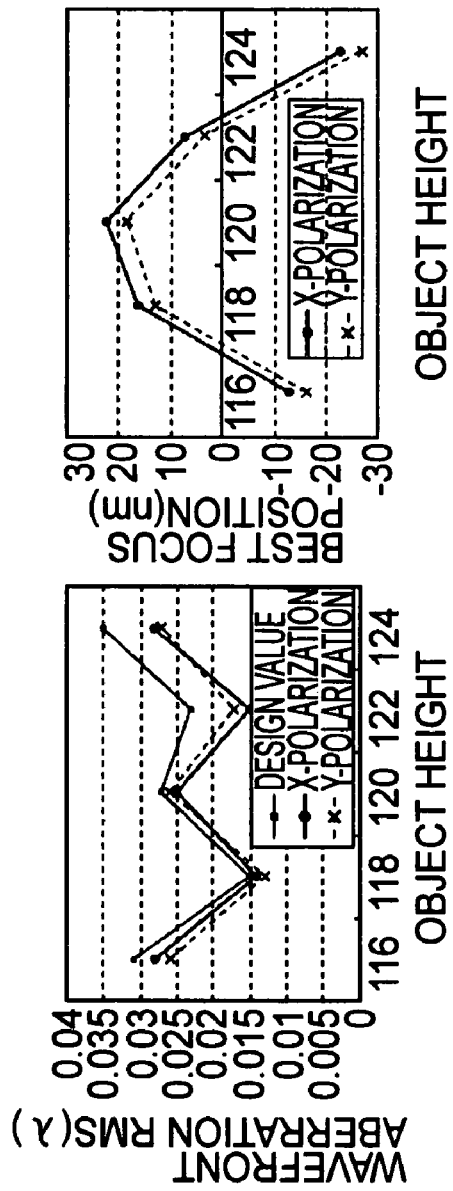
FIG.3C
FIG.3D

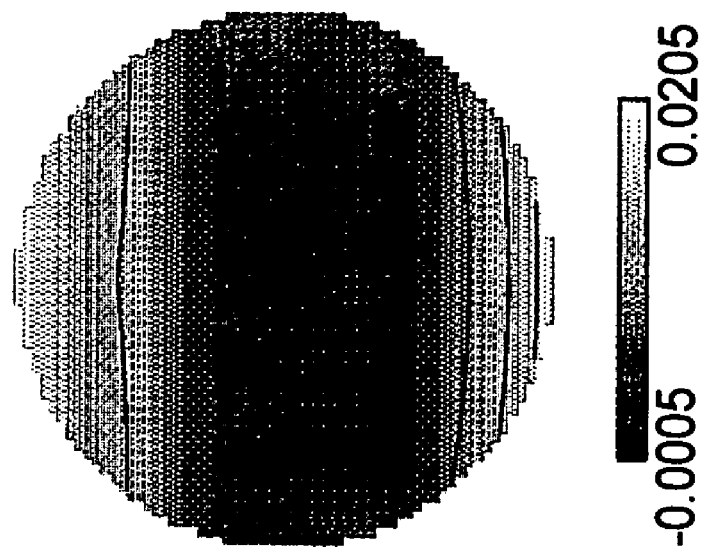
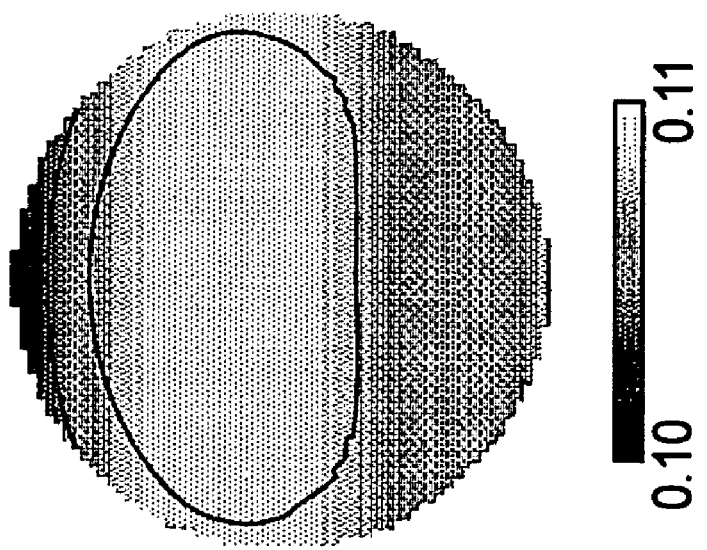

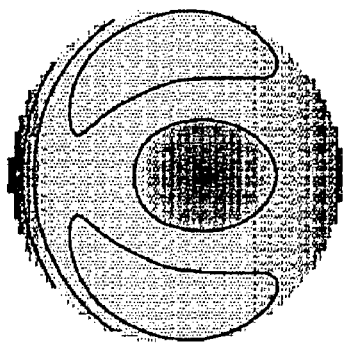
FIG. 8A
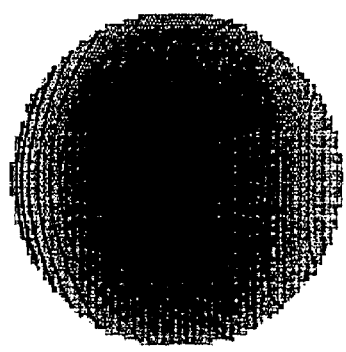
FIG. 8B
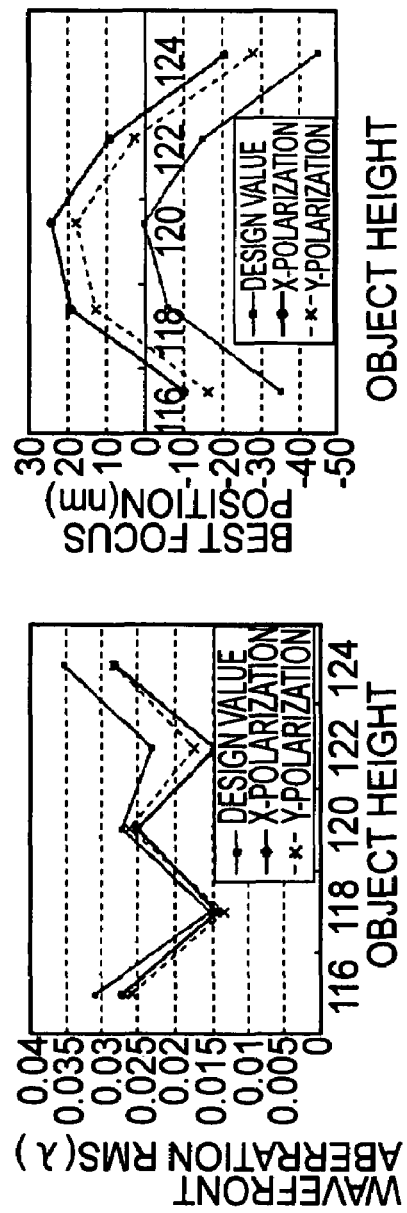

PROJECTION OPTICAL SYSTEM, EXPOSURE APPARATUS, DEVICE MANUFACTURING METHOD, AND DEVICE MANUFACTURED BY USING THE SAME

FIELD OF THE INVENTION AND RELATED ART

This invention relates generally to a projection optical system including a reflection mirror having a reflective multilayered film formed on its surface. The present invention is particularly suitable for an EUV projection optical system of a semiconductor device manufacturing apparatus.

Reduction projection exposure process using ultraviolet rays has been widely used as a lithographic method for producing very fine semiconductor devices such as semiconductor memories or logic circuits. The smallest size that can be transferred by this reduction projection exposure process is proportional to the wavelength of light used for the exposure and also it is inversely proportional to the numerical aperture of the projection optical system. Because of this, the wavelength of light to be used for transfer of fine circuit patterns has been shortened, such as from Hg lamp (wavelength 365 nm) to KrF excimer laser (wavelength 248 nm) and then to ArF excimer laser (wavelength 193 nm).

However, the size of semiconductor devices is decreasing very fast, and the lithography using ultraviolet light has limitations in the microprocessing for production of semiconductor devices. So, reduction projection exposure apparatuses that use extreme ultraviolet light (EUV light) of a wavelength of about 10 to 15 nm, much shorter than the wavelength of ultraviolet light, are being developed to enable efficient printing of extraordinarily fine circuit patterns of a semiconductor device having a linewidth less than 0.1 μm.

In the EUV light region, absorption of light by a substance is very large and, therefore, use of a lens optical system which is based on refraction of light, as being conventionally used with visible light or ultraviolet light, is impractical. Hence, a catoptric system is used in EUV light exposure apparatuses. Regarding reflection optical elements, for improved reflectance, mirrors having a multilayered film formed on the surface thereof are used. A well-known example of the structure of such multilayered film is a periodic multilayered film made of molybdenum (Mo) and silicon (Si). In this periodic multilayered film structure, the unit period comprises two layers of Mo and Si with a thickness of about 7 nm which is approximately a half of a used wavelength of 13.5 nm, and the film is constituted by forty to fifty periods accumulated. In such periodic multilayered film, weak reflection lights from many interfaces of the layers are superposed one upon another with the same phase and, in total, a high reflectance can be provided thereby. However, even if such Mo/Si multilayered film is used, the reflectance per a single mirror surface is about 70% at the best. This means that a structure having more than twenty elements (forty surfaces) as in conventional lens optical systems is difficult to use, in respect to the efficiency of light utilization. An imaging optical system that satisfies the performance being required for semiconductor manufacturing apparatuses must be constituted by elements of a number as small as possible. Currently, a practical optical system as the EUV projection optical system is a six-mirror structure having a numerical aperture (NA) of about 0.25. Many proposals have been made in regard to such an optical system, and an example is U.S. Pat. No. 6,188,513.

Where a multilayered film is used in practice in an optical system, the following points should be taken into account. The reflectance can be increased by a periodic multilayered film constituted by Mo and Si, on condition that the reflection at the boundary or interface is intensified by the interference. This means that the range of incidence angle with which large reflectance is obtainable is limited. The condition can be expressed as follows, where the wavelength is λ, the thickness of a unit period of the multilayered film is d, the average refractive index of the mediums constituting the unit period is n, and the incidence angle is θ:

$$2nd \cdot \cos\theta \approx \lambda \quad (1)$$

Equation (1) above can be regarded as an equation for prescribing the film thickness d for optimum unit period with respect to a certain incidence angle θ.

With respect to the wavelength 13.5 nm, Mo has a refractive index of about 0.93 and Si has a refractive index of about 1.0. Thus, using an average refractive index 0.97 (assuming that the thickness ratio of Mo and Si is 2:3), for an incidence angle θ=0 (deg.), d is nearly equal to 7.0 nm and, for an incidence angle θ=15 (deg.), d is nearly equal to 7.2 nm. Taking an example of multilayered film having forty periods, where the thickness of a unit period is 7.0 nm, a reflectance of about 74% is obtainable with an incidence angle of 0 (zero) degree, whereas it decreases to 15% or less with an incidence angle of 15 degrees. On the other hand, where the thickness of a unit period is 7.2 nm, although a reflectance of 71% or more is obtainable with an incidence angle of 15 degrees, it decreases to about 36%, which is about a half, with an incidence angle of zero degrees. The values of reflectance mentioned to above are even those of idealistic cases and, in practical multilayered films, the reflectance decreases by few percent due to the roughness of boundary surface or bonding thereof.

In order to obtain a sufficient reflectance throughout the whole mirror surface on the basis of a reflection multilayered film, it would be necessary to change the thickness of a unit period in accordance with incidence angles at various points on the mirror surface. Such a multilayered film in which the unit-period thickness has surficial distribution will hereinafter be referred to as "tilt film". The concept of tilt film itself is known in the art, and the applicability of it to the EUV projection optical system is discussed in Japanese Laid-Open Patent Application, Publication No. 09-326347 or Japanese Laid-Open Patent Application, Publication No. 2003-177319, for example.

The surficial distribution of the unit-period thickness used in a tilt film may be determined first by designing, by using a commercially available optics designing software, an optical system to satisfy desired performance without taking into account the multilayered film and then by designing the thickness so as to make the transmittance of the whole optical system largest and also to make the transmittance distribution along the pupil plane smallest (most even) while taking into account the multilayered film and the reflectance of each mirror. During the designing, the film thickness distribution should preferably be applied in the form of some function. In many cases, the EUV projection optical system is a coaxial system wherein all the mirrors have a common axis, called an optical axis, and it is rotationally symmetrical with respect to the optical axis. Here, if the distance from the optical axis is r, the film thickness distribution may be conveniently expressed by an equation of "f(r)=a+br2+cr4+ ..." since then the rotational symmetry that the base optical system possesses can be reserved. Even if terms of the forth order of r or higher orders are introduced, it less contributes to the improvement of transmittance of the whole optical system. Furthermore, it may lead to complicatedness of the aberration by the multilayered film. Normally, in consideration of the above, using terms up to the second order of r will be sufficient. While a case of $f(r)=a+br2$ will be discussed below, this is merely an example and, depending on the design, terms higher than the forth order may be introduced or a function having no rotational symmetry with respect to the optical axis may be used.

Once the film thickness is designed and if the wavefront aberration which might be an index of the performance of the optical system is evaluated subsequently, generally the result is worse due to the influence of the multilayered film as compared with the state in which the multilayered film is not taken into account. In order to restore this, use of adjusting means for optimizing the optical system while taking the multilayered film into account would be necessary. For such adjustment, there are various methods such as a method of moving only the focus position of the image plane, a method of adjusting only the surface interval in the optical system including the focus position of the image plane, a method of adjusting the paraxial curvature radius of each mirror surface in addition to the surface interval, and a method of adjusting all the variable parameters including the aspherical surface coefficient of each mirror surface. These methods may be chosen appropriately in accordance with the extent of degradation of the optical system performance or the evaluation value which is just going to be adjusted. Generally, if the film thickness distribution is taken in terms of up to the second order of r, the original performance can be substantially restored if the adjustment is made as far as the surface interval. Even if wave optical distortion should be corrected exactly, doing the adjustment up to the abaxial curvature of the surface would be sufficient.

A particular design example using a multilayered film having forty periods of Mo and Si layers and having film thickness distribution $f(r)=a+br2$, wherein the surface interval is changed while taking into account the multilayered film, will be shown below.

a) Base projection optical system:
   The projection optical system is based on one disclosed in the second embodiment of U.S. Pat. No. 6,188,513.
b) Used wavelength: 13.5 nm
c) Reflective multilayered film:
   Unit period: Mo is 2.84 nm and Si is 4.07 nm. The film comprised forty periods.
d) The complex refractive index (n-ik) with the wavelength 13.5 nm:

TABLE 1

|    | Refractive Index (n) | Exhaustion Coefficient (k) |
|----|----------------------|----------------------------|
| Mo | 0.921067             | 0.006438                   |
| Si | 0.999313             | 0.001827                   | e) Film thickness distribution: $f(r)=a+br^2$
   [$f(r)=1.0$ corresponds to the unit-period thickness 6.91 (=2.84+4.07) nm.]

TABLE 2

|   | 1st Mirror | 2nd Mirror | 3rd Mirror | 4th Mirror | 5th Mirror | 6th Mirror |
|---|------------|------------|------------|------------|------------|------------|
| a | 1.00989    | 1.00469    | 1.03836    | 1.00869    | 1.03665    | 1.00128    |
| b | −1.97E−07  | 0          | −9.22E−08  | −6.45E−08  | −1.45E−05  | −1.63E−07  | f) Surface interval changes from the base projection optical system:

| 1st object plane to 1st mirror: | −5.09 μm  |
| 1st mirror to 2nd mirror:       | −12.03 μm |
| 2nd mirror to 3rd mirror:       | −50.85 μm |
| 3rd mirror to 4th mirror:       | −7.00 μm  |
| 4th mirror to 5th mirror:       | −24.15 μm |
| 5th mirror to 6th mirror:       | −10.60 μm |
| 6th mirror to 2nd object plane: | +13.70 μm |

Here, as regards the coordinate axes for designating the orientation of the projection optical system, the optical axis direction is taken as z axis, a direction contained in the meridional sectional plane and perpendicular to the optical axis is taken as y axis, and a direction perpendicular to the z and y axes is taken as x axis. In the particular multilayer film design example described hereinbefore, regarding the performance evaluation quantities while taking the multilayered film into account, FIG. 8A shows the pupil transmittance distribution in a case where illumination light to the first object plane is non-polarized light; FIG. 8B shows the difference between the wavefront in a case where the illumination light to the first object plane is polarized in x direction and the wavefront in a case where it is polarized in y direction; FIG. 8C shows the mean square difference (RMS) of the wavefront aberration; and FIG. 8D shows the best focus position. The contour lines in the drawings were drawn at a pitch of 0.005 (=0.5%) for the pupil transmittance distribution and at a pitch of 0.005 for the wavefront difference.

In FIGS. 8A-8D, when the multilayered film is taken into account, although the performance substantially the same as the base projection optical system (design value) is recovered in respect to the root square error of the wavefront aberration, the pupil transmittance distribution under non-polarized light illumination has a distribution being particularly steep at the peripheral portion of the pupil. The presence of such pupil transmittance distribution may cause various inconveniences such as that, when a pattern formed on the surface of the first object is projected through the projection optical system, the imaging characteristic depends on the orientation or size of the pattern, that a resultant deviation of the telecentricity at the second object side creates a positional deviation of the pattern, and that the apparent NA becomes small.

A method of reducing such pupil transmittance distribution may be use of a broadband film arranged to keep the reflectance through a wider angular range as compared with ordinary periodic films. "Design and fabrication of broadband EUV multilayer mirrors" by T. Kuhlmann et al, "Proc. SPIE", Vol. 4688 (2002), pp 509-515, shows examples of such broadband film, that is, a film comprising stacked multilayer films having three different period lengths and a film having no particular period. Ordinary periodic films have a limited angular range of about 8 deg. for attaining high reflectance. In the broadband film, on the other hand, although the absolute value of reflectance is small, the reflectance can be held in a range of about 20 degrees.

However, regarding the broadband film having stacked periodic films, the reflectance varies largely within the angular range of 20 degrees. Therefore, it is not suitable to reduce the pupil transmittance distribution. In the case of a film having no particular period, on the other hand, although the variation is small as compared with the film having stacked periodic films, because the reflectance thereof is low, the applicability of it to a projection optical system has been unexamined. In the particular multilayer film design example described hereinbefore, due to the difference in polarization of illumination light, there were a difference in wavefront and a shift of the best focus position of about 6 nm. It is entirely uncertain that how the optical performance including the wavefront aberration is influenced by a broadband film if it is introduced.

Furthermore, a deviation of the best focus position due to polarization of the illumination light has to be considered as a part of the field curvature allowed in the designing in relation to a low depth-of-focus (DOF), being expected in the EUV projection optical system. This makes the design restriction strictest.

In another aspect, when a situation where a multilayered film is produced upon a mirror surface practically, there is an additional problem such as follows. In the particular multilayer film design example described hereinbefore, from the value of coefficient b, it is seen that the fifth mirror has the steepest film thickness distribution. The range of incidence angle of light rays being incident on this mirror surface is widest as compared with other mirrors. Thus, in the case of ordinary periodic multilayered film, use of film thickness distribution is inevitable to obtain sufficient pupil transmittance. Further, the fifth mirror has a convex surface, like known EUV projection optical systems. Usually, with a film forming method as represented by sputtering method and as performed to a convex surface, the film material density may become small at the peripheral portion of the mirror surface or the film thickness distribution may be difficult to control. Since a change in the film material density causes a change in refractive index, in order to meet the same incidence angel θ, it becomes necessary to alter the unit-period thickness d from its design value in accordance with equation (1). This leads to the necessity of producing film thickness distribution to cancel the density change at the peripheral portion. However, to do both of them at the same time is very difficult.

SUMMARY OF THE INVENTION

It is accordingly an object of the present invention to provide a projection optical system comprising a plurality of mirrors each having a reflective multilayered film, by which at least one of the inconveniences described above can be solved or reduced.

In accordance with an aspect of the present invention, to achieve the above object, there is provided a projection optical system comprising a plurality of mirrors each having a reflection multilayered film, wherein a reflection multilayered film of such a mirror of said plurality of mirrors that has a largest light incidence angle range includes a non-periodic film.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3A-3D illustrate optical performance of a projection optical system, as obtainable when a multilayered film and a designing method according to a first embodiment of the present invention are used.

FIGS. 5A and 5B illustrate optical performance of a projection optical system, as obtainable when a multilayered film and a designing method according to a second embodiment of the present invention are used.

FIGS. 8A-8D illustrate optical performance of a projection optical system, as obtainable when a conventional multilayered film and a conventional designing method are used.

DESCRIPTION OF THE PREFERRED EMBODIMENTS

Preferred embodiments of the present invention will now be described with reference to the attached drawings.

Embodiment 1

A first embodiment of the present invention concerns an example wherein a reflection multilayered film of one mirror, of a plurality of mirrors of a projection optical system, that has a largest light incidence angle range (i.e. the fifth mirror M5) has a laminated structure comprising accumulation (stack) of a non-periodic film and a periodic film and having constant film thickness distribution. The remaining mirrors (i.e. M1, M2, M3, M4 and M6) may comprise a multilayered film having forty periods as conventional, and it may have film thickness distribution as conventional. A multilayer film designing method according to this embodiment as well as the results of evaluation of a projection optical system where such multilayered film is applied to the fifth mirror, will be described below.

Figure 1:
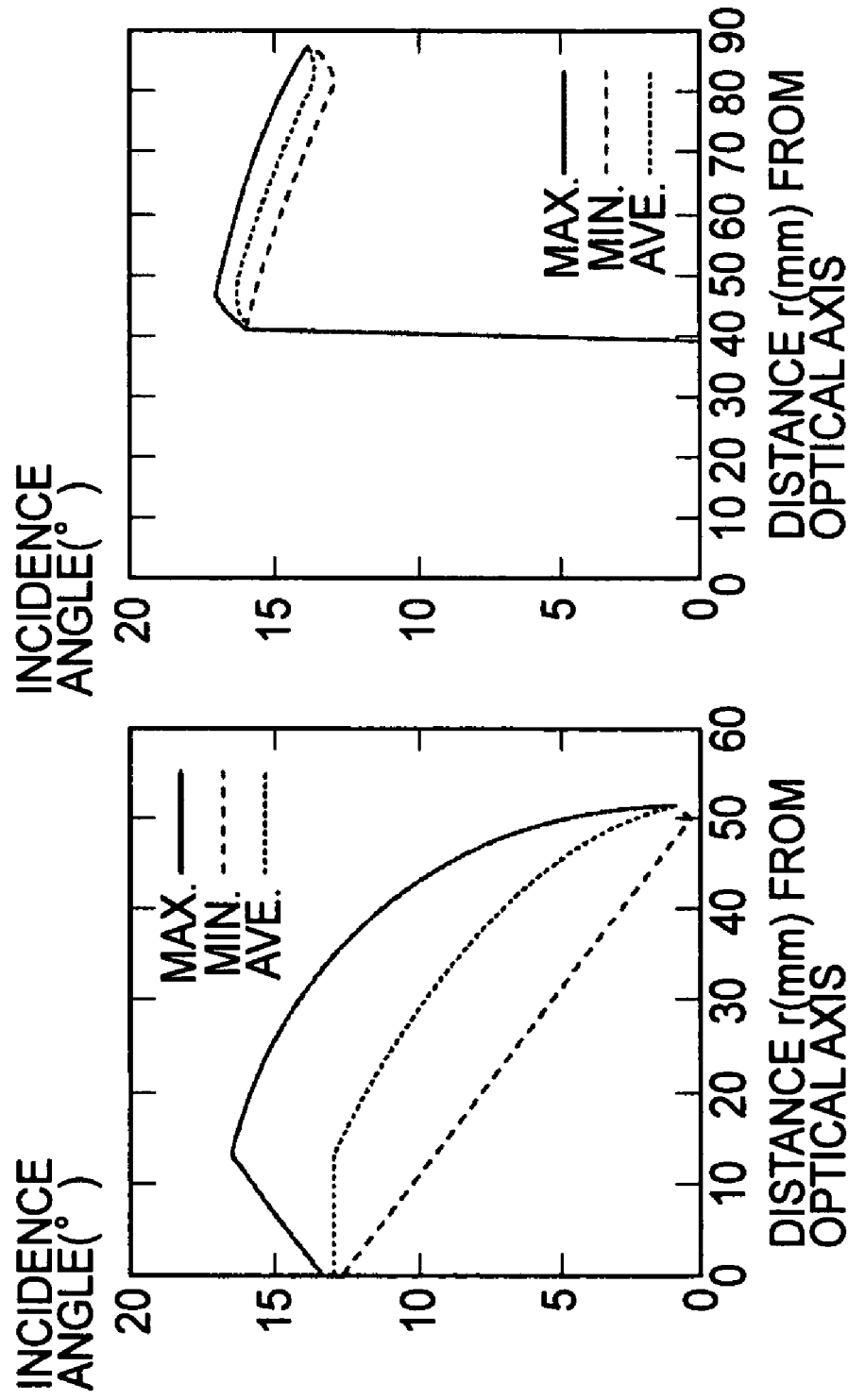
FIG. 1A is a graph for explaining the incidence angle range of a fifth mirror of a base projection optical system that has largest incidence angle range.
FIG. 1B is a graph for explaining the incidence angle range of a third mirror of the base projection optical system that has largest incidence angle average value.

FIG. 1A illustrates the incidence angle range upon the fifth mirror, out of six mirrors included in a base projection optical system, which has a largest incidence angle range. Regarding the incidence angle, while light rays coming from the whole region used on the first object surface (arcuate shaped region of 8 mm width at the object height 116 mm to 124 mm and having a slit length 104 mm) are taken into account and assuming that on each mirror the film thickness distribution becomes rotationally symmetric with respect to the optical axis, the maximum value and the minimum value as well as an average value of the incidence angle in such region which is at a constant distance r from the optical axis, were calculated. The result was a range of 0.3 deg. to 16.4 deg. with respect to the fifth mirror.

According to conventional methods, an initial value of the film thickness distribution is determined on the basis of the thus obtained incidence angle range, and then the film thickness distribution is optimized so that the pupil transmittance satisfies a predetermined standard. For example, by using an average value of incidence angles and on the basis of equation (1), an initial value of the film thickness distribution is determined. Subsequently, it is optimized to make the average pupil transmittance large and to make the distribution range small.

As compared therewith, in accordance with this embodiment of the present invention, first of all, within the incidence angle range described above, a film with which the reflectance as an average of the reflectance of s-polarized light and the reflectance of p-polarized light can be made approximately constant is designed. Such a film is formed on a mirror appropriately with a constant film thickness distribution, in accordance with the average or range of pupil transmittance as required and, subsequently, through adjustment of the optical system, the wavefront aberration is restored.

Figure 2:
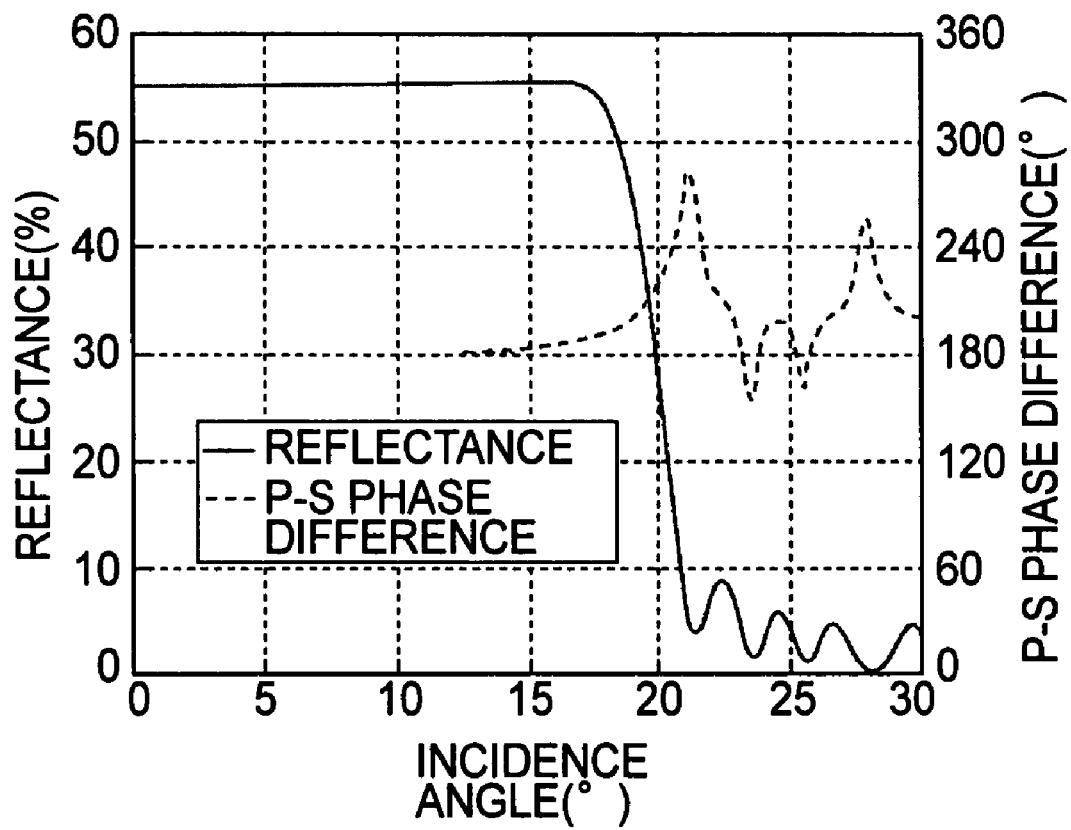
FIG. 2 is a graph for explaining dependence, upon the incidence angle, of the reflectance of a multilayered film according to Table 3 and of the phase difference between s-polarized light and p-polarized light.

Table 3 below shows the structure of the film designed in accordance with the incidence angle range of 0.3 deg. to 16.4 deg. FIG. 2 illustrates the reflectance of that film as well as the phase difference between the s-polarized light and the p-polarized light. The layer numbers in the table are assigned in the order from the mirror substrate.

TABLE 3

| Layer No. | Medium | Layer Thickness (nm) |
|---|---|---|
| 1 | Si | 7.25 |
| 2 | Mo | 3.15 |
| 3 | Si | 4.9 |
| 4 | Mo | 6.71 |
| 5 | Si | 4.04 |
| 6 | Mo | 2.84 |
| 7 | Si | 4.21 |
| 8 | Mo | 1.68 |
| 9 | Si | 4.1 |
| 10 | Mo | 3.35 |
| 11 | Si | 3.42 |
| 12 | Mo | 6.94 |
| 13 | Si | 3.5 |
| 14 | Mo | 5.07 |
| 15 | Si | 12.15 |
| 16 | Mo | 2.35 |
| 17 | Si | 0.83 |
| 18 | Mo | 3.06 |
| 19 | Si | 5.81 |
| 20 | Mo | 4.29 |
| 21 | Si | 3.12 |
| 22 | Mo | 4.57 |
| 23 | Si | 3.67 |
| 24 | Mo | 4.56 |
| 25 | Si | 9.24 |
| 26 | Mo | 1.92 |
| 27 | Si | 4.21 |
| 28 | Mo | 6.26 |
| 29 | Si | 4.37 |
| 30 | Mo | 3.78 |
| 31 | Si | 3.02 |
| 32 | Mo | 4.44 |
| 33 | Si | 7.27 |
| 34 | Mo | 2.22 |
| 35 | Si | 2.91 |
| 36 | Mo | 2.99 |
| 37 | Si | 11.16 |
| 38 | Mo | 1.3 |
| 39 | Si | 4.16 |
| 40 | Mo | 3.86 |
| 41 | Si | 4.35 |
| 42 | Mo | 4.36 |
| 43 | Si | 9.03 |
| 44 | Mo | 5.26 |
| 45 | Si | 9.16 |
| 46 | Mo | 3.91 |
| 47 | Si | 7.29 |
| 48 | Mo | 0.72 |
| 49 | Si | 4.18 |
| 50 | Mo | 5.94 |
| 51 | Si | 10.46 |
| 52 | Mo | 3.53 |
| 53 | Si | 4.46 |
| 54 | Mo | 2.64 |
| 55 | Si | 4.02 |
| 56 | Mo | 3.07 |
| 57 | Si | 2.8 |
| 58 | Mo | 3.29 |
| 59 | Si | 4.83 |
| 60 | Mo | 2.81 |
| 61 | Si | 5.27 |
| 62 | Mo | 3.22 |
| 63 | Si | 10.12 |
| 64 | Mo | 2.64 |
| 65 | Si | 3.03 |
| 66 | Mo | 1.53 |
| 67 | Si | 14.74 |
| 68 | Mo | 1.98 |
| 69 | Si | 7.32 |
| 70 | Mo | 1.47 |
| 71 | Si | 5.48 |
| 72 | Mo | 4.11 |
| 73 | Si | 2.92 |
| 74 | Mo | 3.79 |
| 75 | Si | 3.76 |
| 76 | Mo | 3.5 |
| 77 | Si | 3.68 |
| 78 | Mo | 3.37 |
| 79 | Si | 3.71 |
| 80 | Mo | 3.43 |
| 81 | Si | 3.75 |
| 82 | Mo | 3.41 |
| 83 | Si | 3.71 |
| 84 | Mo | 3.44 |
| 85 | Si | 3.77 |
| 86 | Mo | 3.42 |
| 87 | Si | 3.75 |
| 88 | Mo | 3.44 |
| 89 | Si | 3.8 |
| 90 | Mo | 3.41 |
| 91 | Si | 3.79 |

TABLE 3-continued

| Layer No. | Medium | Layer Thickness (nm) |
|---|---|---|
| 92 | Mo | 3.4 |
| 93 | Si | 3.8 |
| 94 | Mo | 3.34 |
| 95 | Si | 3.8 |
| 96 | Mo | 3.31 |
| 97 | Si | 3.8 |
| 98 | Mo | 3.3 |
| 99 | Si | 3.86 |
| 100 | Mo | 3.32 |
| 101 | Si | 4.01 |
| 102 | Mo | 3.28 |
| 103 | Si | 3.92 |
| 104 | Mo | 3.06 |
| 105 | Si | 3.97 |
| 106 | Mo | 3.06 |
| 107 | Si | 3.88 |
| 108 | Mo | 2.97 |
| 109 | Si | 3.96 |
| 110 | SiO2 | 1 |

According to the film of Table 3, the incidence angle range is 0-17 deg. and the reflectance is 55% which is about ¾ of that or ordinary forty-period film, but it is approximately uniform. In order to keep small the pupil transmittance distribution of the projection optical system, with respect to the set incidence angle range the reflectance distribution should desirably be not greater than 10%, more preferably, not greater than 5%. Also, it is seen that the phase difference between the s-polarized light and the p-polarized light is suppressed within that incidence angle range.

The multilayered film of Table 3 comprises a non-periodic film at the substrate side from the seventy-fourth layer, wherein there are large jumps in the layer thickness; whereas at the outside layer side of the seventy-fourth layer, it comprises a periodic film. Since the average of the incidence angle range 0.3-16.4 deg. is 8.1 deg., the optimum unit-period thickness d of the periodic film is 7.03 nm. Among the first to seventy-third layers, those having a film thickness not less than 7.03 nm are twenty layers which correspond to 16% of the total layers. Thus, they provide a non-periodic film having effective reflectance in a wide incidence angle range. Among the seventy-forth to the one hundred and eleventh layers, on the other hand, there is no layer having a film thickness not less than 7.03 nm. Thus, they provide a periodic film having large reflectance with respect to a particular wavelength. With the structure described above, large reflectance can be held at the surface layer of the multilayered film, while the reflectance can be held constant in a wide incidence angle range by means of the non-periodic film at the substrate side.

The first embodiment of the present invention is an example wherein the reflection multilayer film at the surface where the light-ray incidence angle range is largest, that is, the multilayer film on the fifth mirror, is provided by a multilayer film according to Table 3, and the film thickness distribution thereof is made constant. The remaining mirrors may comprise a multilayered film having forty periods as conventional, and it may have film thickness distribution as conventional. Here, with respect to the base projection optical system, the surface intervals have been changed for restoration of the wavefront aberration, as follows.

| | |
|---|---|
| 1st object plane to 1st mirror: | −40.42 μm |
| 1st mirror to 2nd mirror: | −36.88 μm |
| 2nd mirror to 3rd mirror: | −63.01 μm |
| 3rd mirror to 4th mirror: | −8.68 μm |
| 4th mirror to 5th mirror: | −23.31 μm |
| 5th mirror to 6th mirror: | +13.35 μm |
| 6th mirror to 2nd object plane: | +15.49 μm |

Figure 13A:
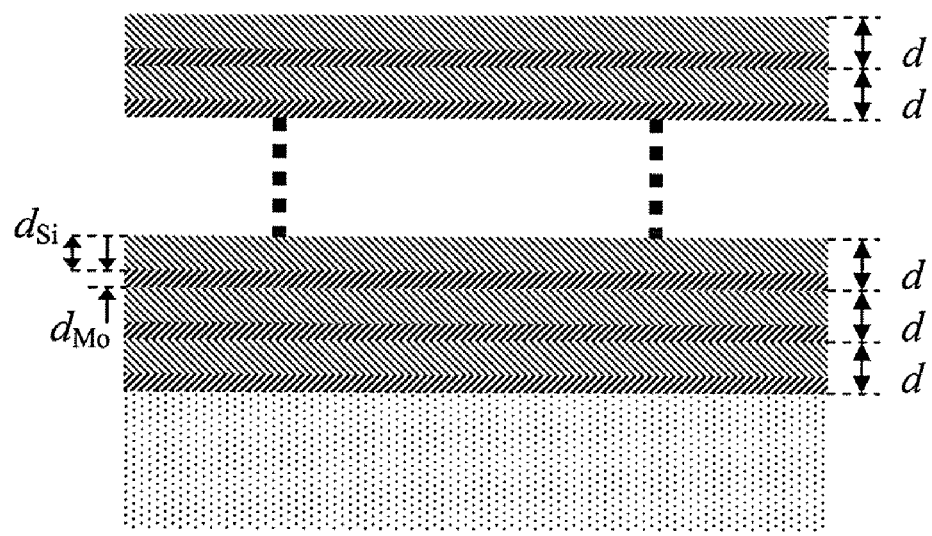
FIGS. 13A and 13B illustrate, respectively, a periodic film having film layers of periodic thickness and a non-periodic film having film layers of non-periodic thickness.
Figure 13B:
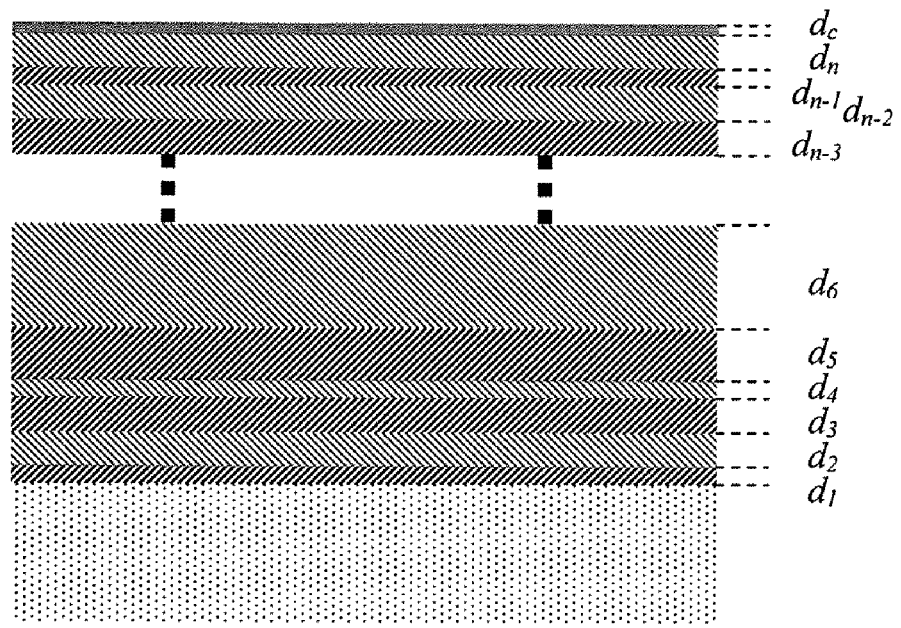

FIGS. 13A and 13B illustrate, respectively, a periodic film having film layers of periodic thickness, and a non-periodic film having film layers of non-periodic thickness.

FIGS. 3A-3D relate to a projection optical system according to the first embodiment, taking the multilayered film into account: more specifically, FIG. 3A shows the pupil transmittance distribution in a case where illumination light to the first object plane is non-polarized light; FIG. 3B shows the difference between the wavefront in a case where the illumination light to the first object plane is polarized in x direction and the wavefront in a case where it is polarized in y direction; FIG. 3C shows the mean square difference (RMS) of the wavefront aberration; and FIG. 3D shows the best focus position. The contour lines in the drawings were drawn at a pitch of 0.005 (=0.5%) for the pupil transmittance distribution and at a pitch of 0.005λ for the wavefront difference. From FIGS. 3A-3D, it is seen that the uniformness of the pupil transmittance distribution is improved and that, in addition to it, the difference in wavefront due to the difference in polarization of illumination light is reduced to about a half. Here, there is substantially no influence upon the wavefront aberration RMS and, furthermore, the difference in the best focus position due to the difference in polarization is well suppressed about 3 nm, in contrast to 6 nm in the conventional film. Although the average pupil transmittance is lower than that of the conventional film while reflecting the decrease of reflectance of the multilayered film according to Table 3, it should be noted that, in addition to the improvements of uniformness of the pupil transmittance distribution, improvements of the imaging characteristic are expected due to the decrease in the difference of polarization. Furthermore, since the reflection multilayer film on the fifth mirror comprises a multilayer film having approximately constant film thickness distribution, the load to controlling the film thickness distribution on a convex surface is reduced, which is advantageous in respect to the film formation. Moreover, the influence on wave optical distortion to be produced by an apparent change of the surface shape due to the thickness of the film as a whole, can be made small. As a result of this, the distortion can be corrected only by the surface interval adjustment, without performing adjustment of abaxial curvature of the mirror substrate. In order to assure these advantageous results, the film thickness distribution of the reflection multilayer film should desirably be suppressed to less than 1%.

In accordance with this embodiment of the present invention, the multilayered films of the remaining mirrors are designed conventionally. However, they may be redesigned as a non-periodic film and, in that occasion, further improvements of the performance are attainable.

Embodiment 2

A second embodiment of the present invention concerns an example wherein, in the projection optical system of the first embodiment, a reflection multilayered film of one mirror having a largest average value in regard to the incidence angles of light rays (i.e. the third mirror M3) has a laminated structure comprising accumulation (stack) of a non-periodic film and a periodic film and having constant film thickness distribution. The remaining first, second, fourth and sixth mirrors may comprise a multilayered film having forty periods as conventional, and it may have film thickness distribution as conventional. A multilayer film designing method according to this embodiment as well as the results of evaluation of a projection optical system where such multilayered film is applied to the third mirror, will be described below.

FIG. 1B illustrates the incidence angle range upon the third mirror having a largest average incidence angle. Regarding the incidence angle, while light rays coming from the whole region used on the first object surface (arcuate shaped region of 8 mm width at the object height 116 mm to 124 mm and having a slit length 104 mm) are taken into account and assuming that on each mirror the film thickness distribution becomes rotationally symmetric with respect to the optical axis, the maximum value and the minimum value as well as an average value of the incidence angle in such region which is at a constant distance r from the optical axis, were calculated. The result was a range of 12.9 deg. to 17.0 deg. with respect to the third mirror.

In accordance with the second embodiment of the present invention, like the first embodiment, within the incidence angle range described above, a film with which the reflectance as an average of the reflectance of s-polarized light and the reflectance of p-polarized light can be made approximately constant is designed. Such a film is formed on a mirror appropriately with a constant film thickness distribution, in accordance with the average or range of pupil transmittance as required and, subsequently, through adjustment of the optical system, the wavefront aberration is restored.

Figure 4:
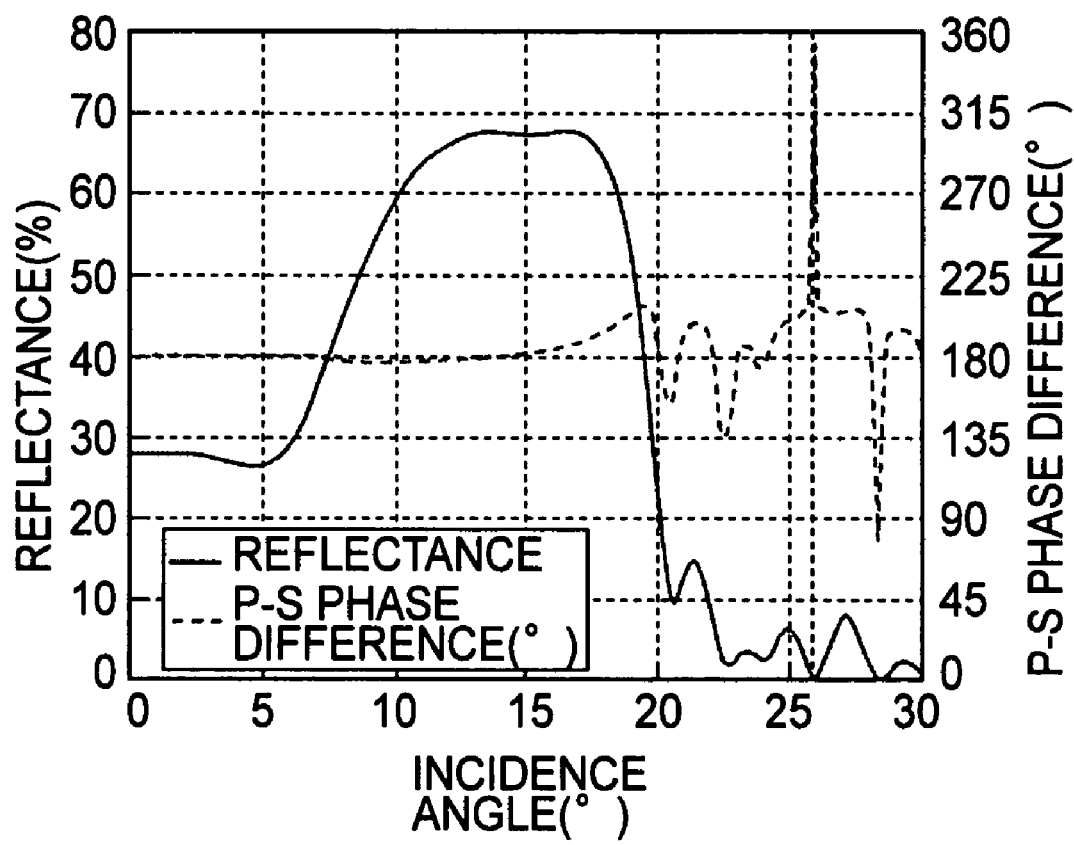
FIG. 4 is a graph for explaining dependence, upon the incidence angle, of the reflectance of a multilayered film according to Table 4 and of the phase difference between s-polarized light and p-polarized light.

Table 4 below shows the structure of the film designed in accordance with the incidence angle range of 12.9 deg. to 17.0 deg. FIG. 4 illustrates the reflectance of that film as well as the phase difference between the s-polarized light and the p-polarized light. The layer numbers in the table are assigned in the order from the mirror substrate.

TABLE 4

| Layer No. | Medium | Layer Thickness (nm) |
| --- | --- | --- |
| 1 | Si | 1.28 |
| 2 | Mo | 11.48 |
| 3 | Si | 3.48 |
| 4 | Mo | 3.85 |
| 5 | Si | 3.54 |
| 6 | Mo | 3.75 |
| 7 | Si | 17.62 |
| 8 | Mo | 11.34 |
| 9 | Si | 5.42 |
| 10 | Mo | 5.57 |
| 11 | Si | 10.62 |
| 12 | Mo | 3.7 |
| 13 | Si | 3.52 |
| 14 | Mo | 3.78 |
| 15 | Si | 3.57 |
| 16 | Mo | 3.67 |
| 17 | Si | 10.65 |
| 18 | Mo | 11.29 |
| 19 | Si | 10.66 |
| 20 | Mo | 11.39 |
| 21 | Si | 10.61 |
| 22 | Mo | 3.57 |
| 23 | Si | 3.75 |
| 24 | Mo | 3.53 |
| 25 | Si | 3.7 |
| 26 | Mo | 3.51 |
| 27 | Si | 4.14 |

TABLE 4-continued

| Layer No. | Medium | Layer Thickness (nm) |
| --- | --- | --- |
| 28 | Mo | 2.89 |
| 29 | Si | 4.9 |
| 30 | Mo | 1.92 |
| 31 | Si | 8.42 |
| 32 | Mo | 1.18 |
| 33 | Si | 19.41 |
| 34 | Mo | 11.21 |
| 35 | Si | 24.65 |
| 36 | Mo | 3.69 |
| 37 | Si | 10.62 |
| 38 | Mo | 3.68 |
| 39 | Si | 24.63 |
| 40 | Mo | 3.7 |
| 41 | Si | 3.63 |
| 42 | Mo | 3.65 |
| 43 | Si | 3.66 |
| 44 | Mo | 3.62 |
| 45 | Si | 10.69 |
| 46 | Mo | 3.63 |
| 47 | Si | 3.69 |
| 48 | Mo | 3.58 |
| 49 | Si | 3.72 |
| 50 | Mo | 3.57 |
| 51 | Si | 10.73 |
| 52 | Mo | 3.54 |
| 53 | Si | 3.76 |
| 54 | Mo | 3.52 |
| 55 | Si | 3.78 |
| 56 | Mo | 3.49 |
| 57 | Si | 3.81 |
| 58 | Mo | 3.45 |
| 59 | Si | 3.84 |
| 60 | Mo | 3.42 |
| 61 | Si | 3.86 |
| 62 | Mo | 3.38 |
| 63 | Si | 3.89 |
| 64 | Mo | 3.36 |
| 65 | Si | 3.91 |
| 66 | Mo | 3.33 |
| 67 | Si | 3.94 |
| 68 | Mo | 3.3 |
| 69 | Si | 3.96 |
| 70 | Mo | 3.26 |
| 71 | Si | 3.99 |
| 72 | Mo | 3.23 |
| 73 | Si | 4.02 |
| 74 | Mo | 3.19 |
| 75 | Si | 4.05 |
| 76 | Mo | 3.16 |
| 77 | Si | 4.07 |
| 78 | Mo | 3.12 |
| 79 | Si | 4.1 |
| 80 | Mo | 3.09 |
| 81 | Si | 4.13 |
| 82 | Mo | 3.06 |
| 83 | Si | 4.16 |
| 84 | Mo | 3.02 |
| 85 | Si | 4.19 |
| 86 | Mo | 2.98 |
| 87 | Si | 4.22 |
| 88 | Mo | 2.95 |
| 89 | Si | 4.25 |
| 90 | Mo | 2.91 |
| 91 | Si | 4.1 |
| 92 | SiO2 | 1 |

According to the film of Table 4, in the incidence angle range of 12.5 deg. to 17.5 deg., the reflectance is approximately uniform at 67%. In order to keep small the pupil transmittance distribution of the projection optical system, with respect to the set incidence angle range the reflectance distribution should desirably be not greater than 10%, more preferably, not greater than 5%. Also, it is seen that the phase difference between the s-polarized light and the p-polarized light is suppressed within that incidence angle range.

The multilayered film of Table 4 comprises a non-periodic film at the substrate side from the fifty-second layer, wherein there are large jumps in the layer thickness; whereas at the outside surface layer side of the fifty-second layer, it comprises a periodic film. Since the average of the incidence angle range 12.9-17.0 deg. is 15.0 deg., the optimum unit-period thickness d of the periodic film is 7.20 nm. Among the first to fifty-first layers, those having a film thickness not less than 7.20 nm are seventeen layers which correspond to 33% of the total layers. Thus, they provide a non-periodic film having effective reflectance in a wide incidence angle range. Among the fifty-second to ninety-second layers, on the other hand, there is no layer having a film thickness not less than 7.20 nm. Thus, they provide a periodic film having large reflectance with respect to a particular wavelength. With the structure described above, large reflectance can be held at the surface layer of the multilayered film, while the reflectance can be held constant in a wide incidence angle range by means of the non-periodic film at the substrate side.

The second embodiment of the present invention is an example wherein, in the projection optical system of the first embodiment, the reflection multilayer film at the surface where the average of light-ray incidence angles is largest, that is, the multilayer film on the third mirror, is provided by a multilayer film according to Table 4, and the film thickness distribution thereof is made constant. The remaining first, second, fourth and sixth mirrors may comprise a multilayered film having forty periods as conventional, and it may have film thickness distribution as conventional. Here, with respect to the base projection optical system, the surface intervals have been changed for restoration of the wavefront aberration, as follows.

| 1st object plane to 1st mirror: | −36.50 μm |
| 1st mirror to 2nd mirror: | −30.57 μm |
| 2nd mirror to 3rd mirror: | −53.83 μm |
| 3rd mirror to 4th mirror: | −6.88 μm |
| 4th mirror to 5th mirror: | −16.43 μm |
| 5th mirror to 6th mirror: | +12.19 μm |
| 6th mirror to 2nd object plane: | +13.72 μm |

FIGS. 5A and 5B relate to a projection optical system according to the second embodiment, taking the multilayered film into account: more specifically, FIG. 5A shows the pupil transmittance distribution in a case where illumination light to the first object plane is non-polarized light, and FIG. 5B shows the difference between the wavefront in a case where the illumination light to the first object plane is polarized in x direction and the wavefront in a case where it is polarized in y direction. The contour lines in the drawings were drawn at a pitch of 0.0025 (=0.25%) for the pupil transmittance distribution, which is about a half pitch of FIG. 3 or 8. Regarding the wavefront difference, the lines are drawn at the same pitch of 0.005λ. From FIGS. 5A and 5B, it is seen that the uniformness of the pupil transmittance distribution is improved even in comparison with FIG. 3 and that, in addition to it, the decrease of pupil transmittance average resulting from the application of a non-periodic film is also suppressed. Furthermore, the difference in wavefront due to the difference in polarization of illumination light is similar to that of FIG. 3 and thus it is reduced to about a half of the conventional film. Here, while not shown in the drawings, it has been confirmed that the wavefront aberration MRS as well as the best focus position are similar to those shown in the FIG. 3. Thus, advantageous results similar to those of the first embodiment are attainable with the second embodiment.

Furthermore, since the reflection multilayer film on the third mirror comprises a multilayer film having approximately constant film thickness distribution, the load to controlling the film thickness distribution on a convex surface is reduced, which is advantageous in respect to the film formation. Moreover, the influence on wave optical distortion to be produced by an apparent change of the surface shape due to the thickness of the film as a whole, can be made small. As a result of this, the distortion can be corrected only by the surface interval adjustment, without performing adjustment of abaxial curvature of the mirror substrate. In order to assure these advantageous results, the film thickness distribution of the reflection multilayer film should desirably be suppressed to less than 1%.

In accordance with the second embodiment of the present invention, the multilayered films of the remaining first, second, fourth and sixth mirrors are designed conventionally. However, they may be redesigned as a non-periodic film and, in that occasion, further improvements of the performance are attainable.

Embodiment 3

A third embodiment of the present invention will be described below.

It is seen from the first and second embodiments that, although a multilayer film arranged to provide approximately uniform reflectance throughout a wide incidence angle range has a large effect of suppressing the pupil transmittance distribution, the average value of pupil transmittance tends to become small. In accordance with this embodiment of the present invention, as compared therewith, a reflection multilayer film having a non-periodic film is used to provide approximately uniform reflectance throughout a wide incidence angle range and, on the other hand, the film thickness distribution is controlled so that, at each point on the mirror surface, the reflectance becomes largest with the average value of the incidence angle. With this arrangement, the reflectance at each point on the mirror surface can be made uniform within the incidence angle range and, furthermore, the reflectance at each point can be made large. Thus, the decrease of pupil transmittance average can be prevented. Here, in a region where the incidence angel is small such as 10 deg. or less, for example, the reflectance may be made approximately uniform even by an ordinary periodic film. However, with the increase of the incidence angle, the incidence angle range where a large reflectance is obtainable is narrowed. Taking this into account, a particular note should be paid to a case where the incidence angle becomes large up to at least about 15 degrees.

Figure 6:
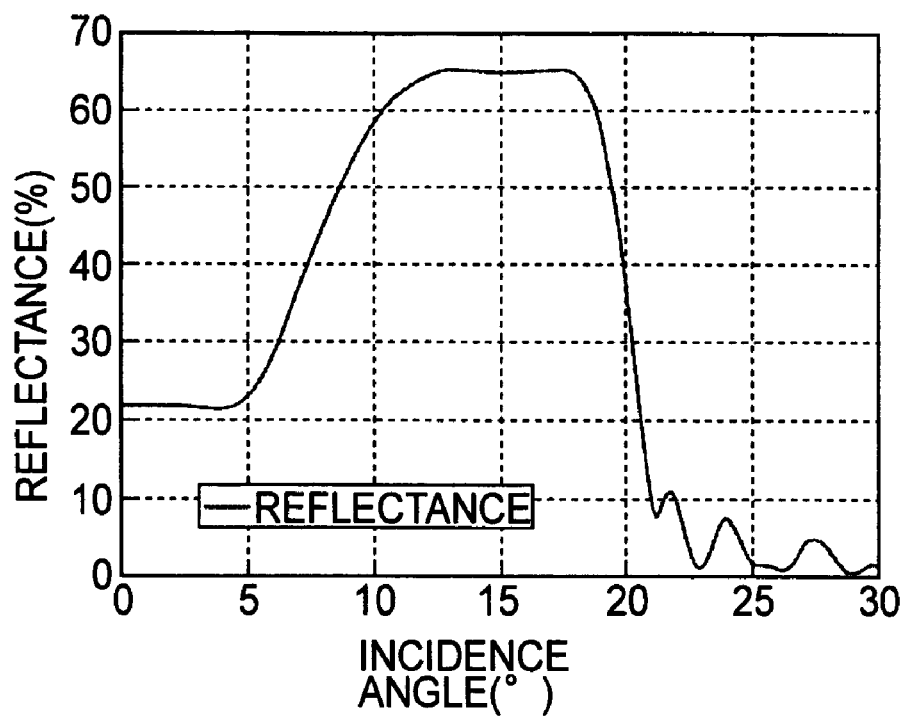
FIG. 6 is a graph for explaining dependence, upon the incidence angle, of the reflectance of a multilayered film according to Table 5.

Table 5 below shows the structure of the film designed in accordance with the incidence angle range of 11.5 deg. to 18.5 deg. FIG. 6 illustrates the dependency of the reflectance of the film upon the incidence angle. The layer numbers in the table are assigned in the order from the mirror substrate.

The multilayered film shown in Table 5 satisfies more than 95% of a largest reflectance (65.2%) with an incidence angular range of 11.5 to 18.5 deg. In order to keep small the pupil transmittance distribution of the projection optical system, with respect to the set incidence angle range the reflectance distribution should desirably be not greater than 10%, more preferably, not greater than 5%.

TABLE 5

| Layer No. | Medium | Layer Thickness (nm) |
|---|---|---|
| 1 | Si | 1.23 |
| 2 | Mo | 6.92 |
| 3 | Si | 3.82 |
| 4 | Mo | 3.9 |
| 5 | Si | 3.6 |
| 6 | Mo | 3.73 |
| 7 | Si | 17.67 |
| 8 | Mo | 11.36 |
| 9 | Si | 3.63 |
| 10 | Mo | 3.67 |
| 11 | Si | 10.67 |
| 12 | Mo | 3.59 |
| 13 | Si | 3.74 |
| 14 | Mo | 6.1 |
| 15 | Si | 4.95 |
| 16 | Mo | 3.41 |
| 17 | Si | 10.77 |
| 18 | Mo | 11.33 |
| 19 | Si | 10.63 |
| 20 | Mo | 11.35 |
| 21 | Si | 10.62 |
| 22 | Mo | 3.69 |
| 23 | Si | 3.64 |
| 24 | Mo | 3.65 |
| 25 | Si | 3.67 |
| 26 | Mo | 3.61 |
| 27 | Si | 3.7 |
| 28 | Mo | 3.58 |
| 29 | Si | 31.77 |
| 30 | Mo | 11.23 |
| 31 | Si | 70.65 |
| 32 | Mo | 2.16 |
| 33 | Si | 4.71 |
| 34 | Mo | 2.95 |
| 35 | Si | 4.22 |
| 36 | Mo | 3.17 |
| 37 | Si | 11.05 |
| 38 | Mo | 3.37 |
| 39 | Si | 3.91 |
| 40 | Mo | 3.39 |
| 41 | Si | 3.9 |
| 42 | Mo | 3.39 |
| 43 | Si | 10.89 |
| 44 | Mo | 3.44 |
| 45 | Si | 3.85 |
| 46 | Mo | 3.42 |
| 47 | Si | 3.86 |
| 48 | Mo | 3.41 |
| 49 | Si | 3.88 |
| 50 | Mo | 3.4 |
| 51 | Si | 3.89 |
| 52 | Mo | 3.38 |
| 53 | Si | 3.9 |
| 54 | Mo | 3.37 |
| 55 | Si | 3.91 |
| 56 | Mo | 3.35 |
| 57 | Si | 3.93 |
| 58 | Mo | 3.33 |
| 59 | Si | 3.94 |
| 60 | Mo | 3.31 |
| 61 | Si | 3.96 |
| 62 | Mo | 3.29 |
| 63 | Si | 3.97 |
| 64 | Mo | 3.27 |
| 65 | Si | 3.99 |
| 66 | Mo | 3.24 |
| 67 | Si | 4.01 |
| 68 | Mo | 3.22 |
| 69 | Si | 4.04 |
| 70 | Mo | 3.18 |
| 71 | Si | 4.06 |
| 72 | Mo | 3.15 |
| 73 | Si | 4.09 |
| 74 | Mo | 3.11 |
| 75 | Si | 4.12 |
| 76 | Mo | 3.06 |
| 77 | Si | 4.16 |
| 78 | Mo | 3 |
| 79 | Si | 4.21 |
| 80 | Mo | 2.93 |
| 81 | Si | 4.26 |
| 82 | Mo | 2.84 |
| 83 | Si | 4.05 |
| 84 | SiO2 | 1 |

It is seen that, in the multilayered film of Table 4, there are large jumps in the layer thickness at the substrate side from the forty-fourth layer, whereas at the outside surface layer side of the forty-fourth layer, a substantially periodic film is produced there. Since the average of the incidence angle range 11.5-18.5 deg. is 15.0 deg., the optimum unit-period thickness d of the periodic film is 7.20 nm. Among the first to forty-third layers, those having a film thickness not less than 7.20 nm are thirteen layers which correspond to 30% of the total layers. Thus, they provide a non-periodic film having effective reflectance in a wide incidence angle range. Among the forty-forth to eighty-fourth layers, on the other hand, there is no layer having a film thickness not less than 7.20 nm. Thus, they provide a periodic film having large reflectance with respect to a particular wavelength. With the structure described above, large reflectance can be held at the surface layer of the multilayered film, while the reflectance can be held constant in a wide incidence angle range by means of the non-periodic film at the substrate side.

The third embodiment of the present invention is an example wherein a reflection multilayered film according to Table 5 is provided to the fifth mirror, having largest influence, in accordance with a film thickness distribution $f(r) = 0.9965 - 1.386e{-5}r^2$. The remaining mirrors may comprise a multilayered film having forty periods as conventional, and it may have film thickness distribution as conventional. Here, with respect to the base projection optical system, the surface intervals have been changed for restoration of the wavefront aberration, as follows.

| | |
|---|---|
| 1st object plane to 1st mirror: | +0.48 μm |
| 1st mirror to 2nd mirror: | −8.00 μm |
| 2nd mirror to 3rd mirror: | −42.11 μm |
| 3rd mirror to 4th mirror: | −6.78 μm |
| 4th mirror to 5th mirror: | −24.27 μm |
| 5th mirror to 6th mirror: | +7.53 μm |
| 6th mirror to 2nd object plane: | +11.28 μm |

Figure 7:
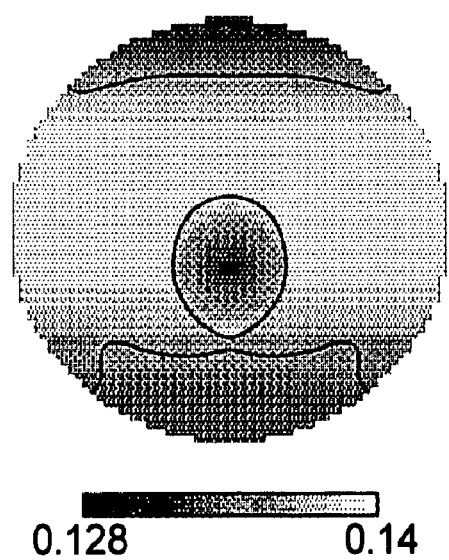
FIG. 7 illustrates pupil transmittance distribution of a projection optical system, as obtainable when a multilayered film and a designing method according to a third embodiment of the present invention are used.

FIG. 7 shows a pupil transmittance distribution in the third embodiment of the present invention. Contour lines are drawn at a pitch of 0.005 (=0.5%). Although the wavefront aberration and other optical performance are unshown, they are similar to those of the first and second embodiments. The average pupil transmittance of the third embodiment is large as compared with the first and second embodiments, and the minimum value of the pupil transmittance is similar to that of the conventional film. On the other hand, while a slight distribution appears, the range thereof is suppressed as compared with the conventional film. As described above, by providing a film thickness distribution in a multilayer film having approximately uniform reflectance within a certain incidence angle range, the uniformness of the pupil transmittance distribution can be improved on one hand while the decrease of average pupil transmittance can be suppressed on the other hand.

In accordance with the third embodiment of the present invention, the multilayered films of the remaining mirrors are designed conventionally. However, they may be redesigned as a non-periodic film and, in that occasion, further improvements of the performance are attainable.

Embodiment 4

A fourth embodiment is an example wherein a projection optical system that comprises a mirror having formed thereon a multilayered film including a non-periodic film as has been described with reference to any one of the first to third embodiments, is incorporated into an exposure apparatus. A case where the projection optical system is applied to an EUV exposure apparatus will be described below.

Figure 12:
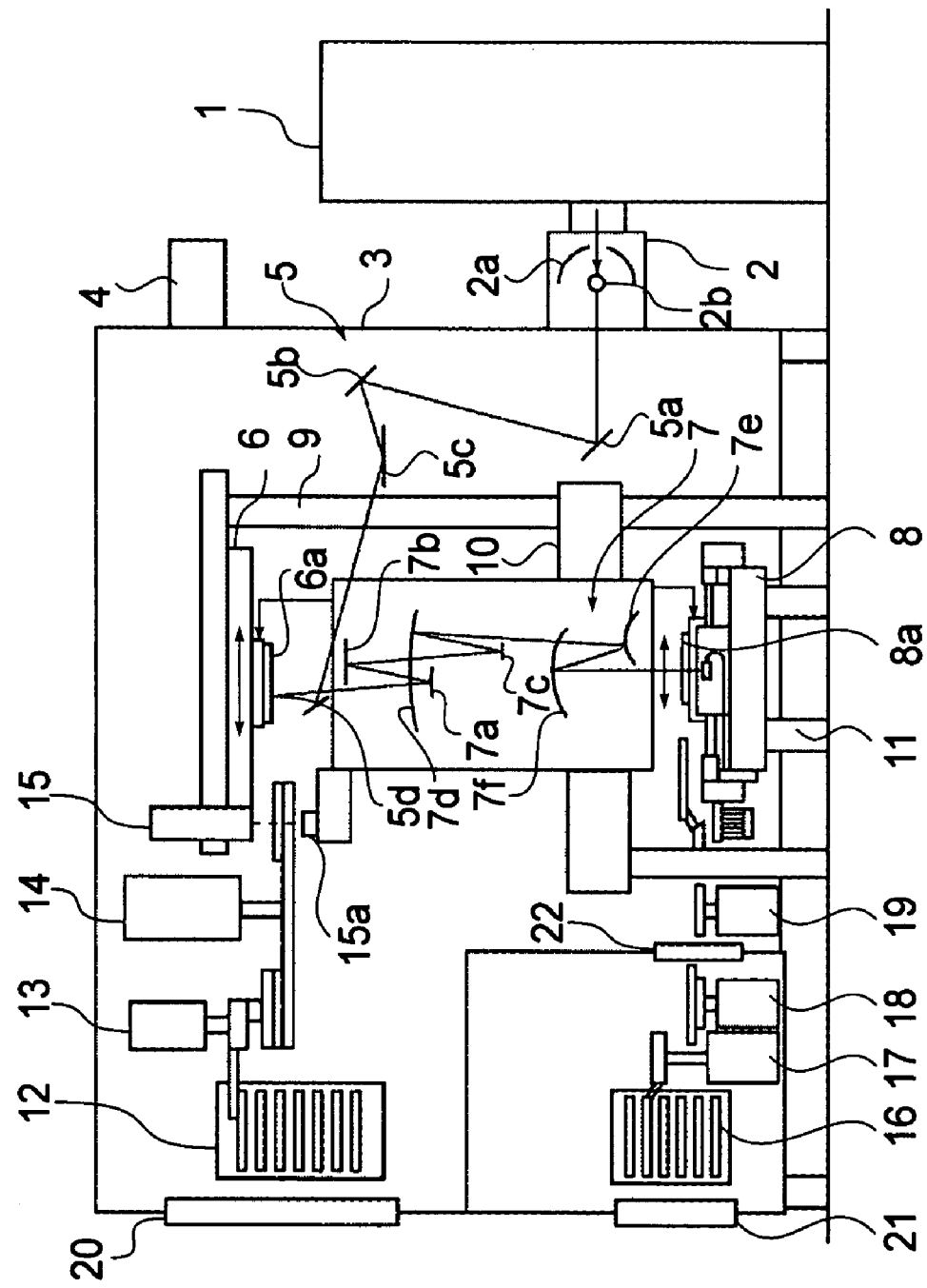
FIG. 12 is a schematic view of an exposure apparatus to which the present invention is applicable.

FIG. 12 is a schematic view of a main portion of an exposure apparatus according to this embodiment. Denoted in FIG. 12 at 1 is an exciting laser, and it is arranged to project a laser beam toward a point where a light source material for producing a light emission point of a light source is provided in gasified state, liquefied state or sprayed gas state, to cause plasma excitement of light source material atoms and to produce extreme ultraviolet light. In this embodiment, the exciting laser 1 comprises a YAG solid laser.

Denoted at 2 is a light emitting portion of the light source, and it has a structure for keeping vacuum in the interior thereof. Denoted at 2b is a light source and actually it corresponds to a light emitting point of an exposure light source. Denoted at 2a is a condensing mirror for reflecting and collecting all spherical surface lights from the light source 2b into registration with the light emission direction to produce exposure light. By using a nozzle (not shown), liquefied Xe, fog of liquefied Xe or Xe gas is discharged to the position of the light source 2b.

Denoted at 3 is a vacuum chamber for accommodating the entire exposure apparatus therein. Denoted at 4 is a vacuum pump for evacuating the vacuum chamber 3 to keep the vacuum state therein. Denoted at 5 is an exposure light introducing portion for introducing and shaping the exposure light from the light-source light emitting portion 2. The exposure light introducing portion 5 comprises mirrors 5a-5d, and it serves to homogenize and shape the exposure light.

Denoted at 6 is a reticle stage, and an original 6a which is a reflective original of exposure pattern is placed on a movable portion of the reticle stage. Denoted at 7 is a reduction projection optical system for projecting the exposure pattern, reflected from the original 6a, onto a wafer in a reduced scale. In this reduction projection optical system 7, the exposure light is reflected successively by mirrors 7a-7f, and finally the exposure pattern is reduced and projected upon the wafer at a predetermined reduction magnification.

Denoted at 8 is a wafer stage, and a wafer 8a is mounted thereon. The wafer 8a comprises a Si substrate which is going to be exposed by the exposure pattern of the original 6a being reflectively projected thereon in a reduced scale. The wafer stage 8 has a function for positioning the wafer 8a at a predetermined exposure position and, to this end, the wafer stage can be position-controlled movably with respect to six axes, that is, X, Y and Z axes as well as tilt directions about X and Y axes and a rotational direction about Z axis.

Denoted at 9 is a reticle stage support for supporting the reticle stage 6 with respect to the floor where the apparatus is installed. Denoted at 10 is a projection system main frame for supporting the reduction projection optical system 7 with respect to the floor. Denoted at 11 is a wafer stage support for supporting a wafer stage 8 with respect to the floor. The reticle stage 5, the reduction projection optical system 7 and the wafer stage 8 are supported separately and independently from each other by means of the aforementioned reticle stage 9, the projection system main frame 10 and the wafer stage support 11. Between the reticle stage 5 and the projection optical system 7 and between the projection optical system 7 and the wafer stage 8, there are position control means (not shown) for measuring the relative position of them and for controlling to keep a predetermined relative positional relationship between them. Further, the reticle stage support 9, the projection system main frame 10 and the wafer stage support 11 are provided with mounts (not shown) for insulating them with respect to vibration from the floor where the apparatus is installed.

Denoted at 12 is a reticle stocker for temporally storing the original 6a (reticle) into the inside of the apparatus from the outside of the apparatus. In this reticle stocker 12, a plurality of reticles having different patterns and corresponding to different exposure conditions are stored in a tightly closed container. Denoted at 13 is a reticle changer for choosing and conveying one reticle to be used, out of the reticle stocker 12.

Denoted at 14 is a reticle alignment unit having a rotary hand which is movable in X, Y and Z axes and rotatable about the Z axis. The reticle alignment unit 14 receives an original 6a from the reticle changer 13 and conveys the same into the view field of a reticle alignment scope 15 provided at an end portion of the reticle stage 6, while rotating the original by 180 deg. Then, the reticle alignment unit minutely moves the original 6a in X, Y and Z rotational direction relative to an alignment mark 15a which is provided with reference to the reduction projection optical system 7, for alignment of the original 6a. More specifically, by minutely moving and adjusting the original 6a in X and Y shift directions as wall as in Z rotational direction, an alignment mark provided on the original 6a is brought into alignment with the alignment mark 15a. In this manner, when the original is held fixed on the reticle stage, the original is aligned with reference to the projection system. After the alignment is completed, the original 6a is chucked onto the reticle stage 6.

Denoted at 16 is a wafer stocker for temporally storing a wafer 8a into the inside of the apparatus from the outside of the apparatus. In the wafer stocker, a plurality of wafers are stored in a container. Denoted at 17 is a conveying robot for choosing a wafer to be exposure-processed out of the wafer stocker 16 and for conveying the same to a wafer mechanical prealignment and temperature adjusting machine 18. The wafer mechanical prealignment and temperature adjusting machine 18 has a function for performing coarse position adjustment of the wafer in the rotational direction and also for adjusting the wafer temperature toward a controlled temperature of the exposure apparatus. Denoted at 19 is a wafer feeding hand for moving the wafer having been prealigned and temperature adjusted by the machine 18, onto the wafer stage 8.

Denoted at 20 and 21 are gate valves which constitute a gate opening and closing mechanism for introducing a reticle and a wafer from the outside of the apparatus. Denoted at 22 is a similar gate valve which functions to isolate, inside the apparatus and by use of a partition wall, the spaces of the wafer stocker 16 and the wafer mechanical prealignment and temperature adjusting machine 18 from the exposure space. The gate valve 22 opens and closes only when a wafer is going to be conveyed outwardly. Through the isolation using a partition wall, when a wafer is conveyed between the inside and outside of the apparatus, the volume capacity being opened to the atmosphere can be minimized so that a vacuum balanced state can be recovered promptly. In accordance with the exposure apparatus of this embodiment, a mirror with a multilayered film having a non-periodic film is used to reduce the pupil transmittance distribution of the projection optical system, such that the imaging performance of the exposure apparatus can be improved significantly. Thus, an exposure apparatus having a projection optical system such as described above is a part of the present invention.

Embodiment 5

Next, referring to FIGS. 9 and 10, an embodiment of a device manufacturing method which uses an exposure apparatus such as shown in FIG. 12, will be explained.

Figure 9:
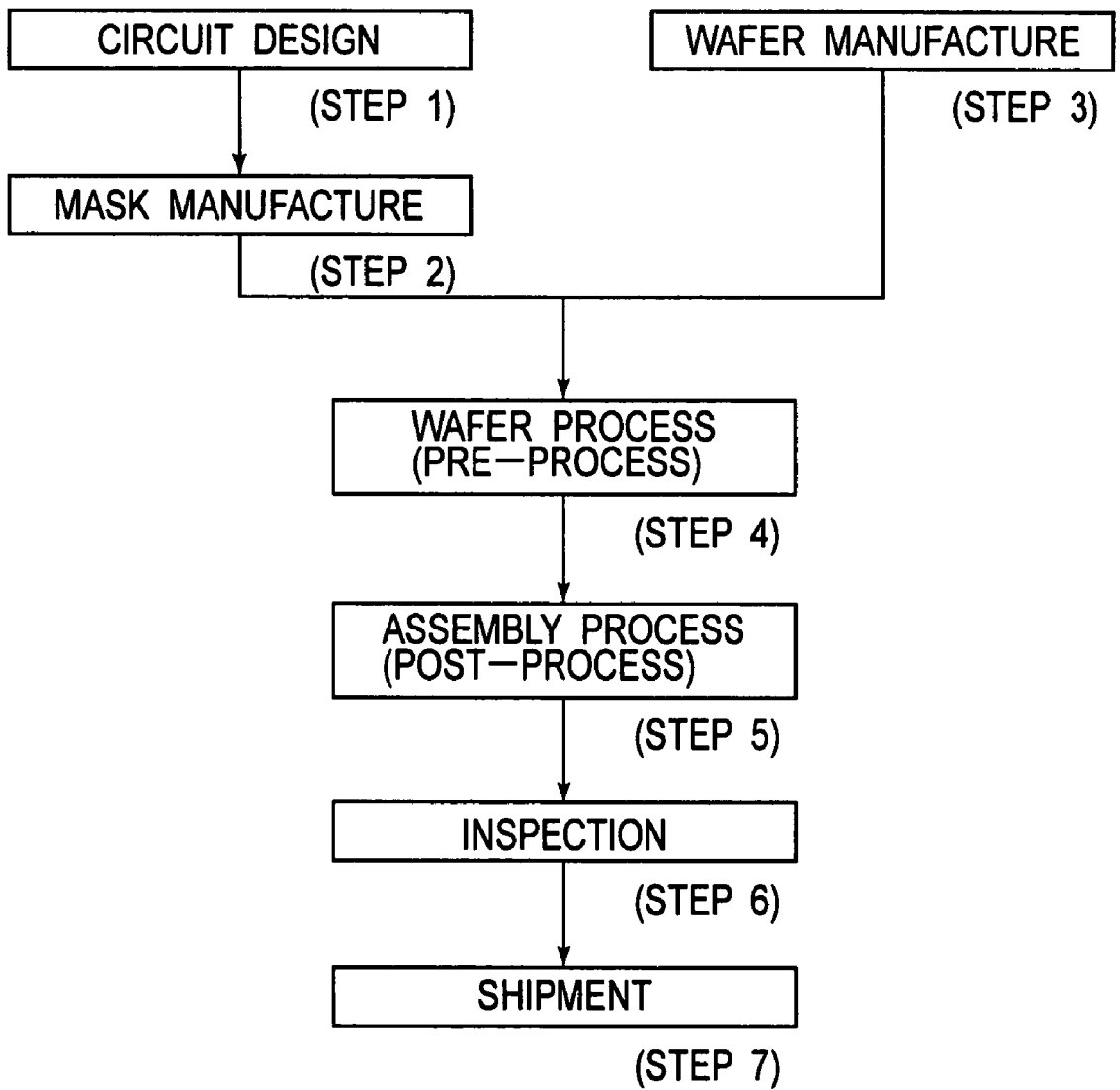
FIG. 9 is a flow chart for explaining processes for manufacturing devices such as semiconductor chips (IC or LSI, for example), LCD or CCD, for example.

FIG. 9 is a flow chart for explaining the procedure of manufacturing various microdevices such as semiconductor chips (e.g., ICs or LSIs), liquid crystal panel devices, or CCDs, for example. In this embodiment, description will be made to an example of semiconductor chip production. Step 1 is a design process for designing a circuit of a semiconductor device. Step 2 is a process for making a mask on the basis of the circuit pattern design. Step 3 is a process for preparing a wafer by using a material such as silicon. Step 4 is a wafer process which is called a pre-process wherein, by using the thus prepared mask and wafer, a circuit is formed on the wafer in practice, in accordance with lithography. Step 5 subsequent to this is an assembling step which is called a post-process wherein the wafer having been processed at step 4 is formed into semiconductor chips. This step includes an assembling (dicing and bonding) process and a packaging (chip sealing) process. Step 6 is an inspection step wherein an operation check, a durability check an so on, for the semiconductor devices produced by step 5, are carried out. With these processes, semiconductor devices are produced, and they are shipped (step 7).

Figure 10:
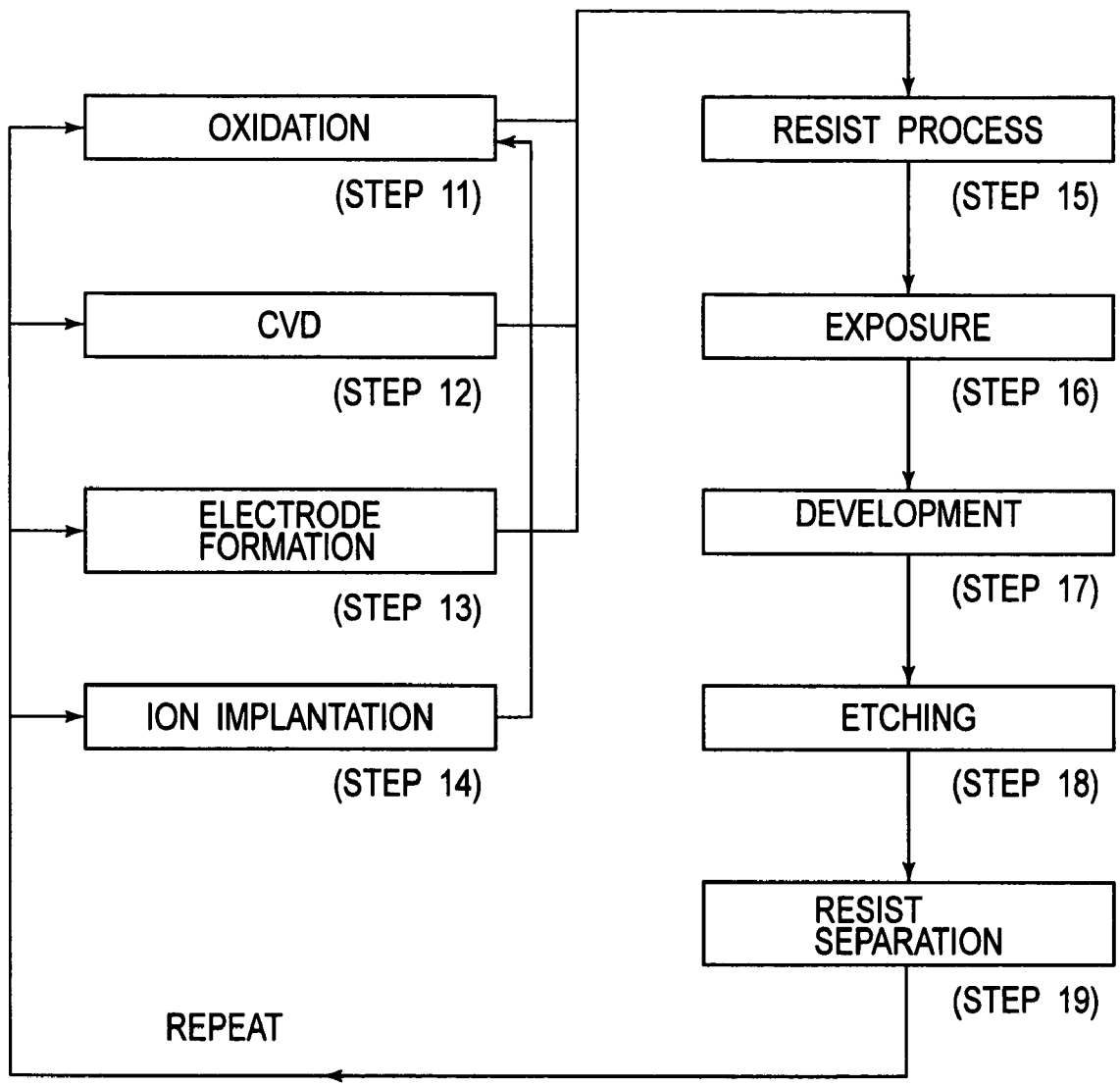
FIG. 10 is a flow chart for explaining details of a wafer process included at step 4 of FIG. 9.
Figure 11:
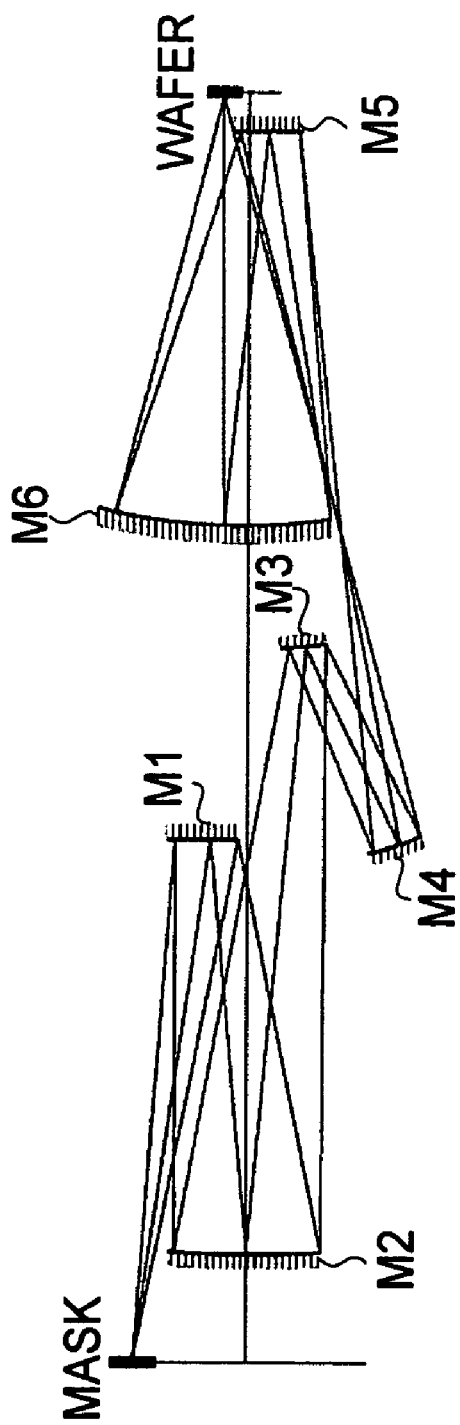
FIG. 11 is a schematic view of a base projection optical system corresponding to an optical system according to a second embodiment disclosed in U.S. Pat. No. 6,188,513.

FIG. 10 is a flow chart for explaining details of the wafer process at step 4. Step 11 is an oxidation process for oxidizing the surface of a wafer. Step 12 is a CVD process for forming an insulating film on the wafer surface. Step 13 is an electrode forming process for forming electrodes upon the wafer by vapor deposition. Step 14 is an ion implanting process for implanting ions to the wafer. Step 15 is a resist process for applying a resist (photosensitive material) to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer. With these processes, high density microdevices can be manufactured. Thus, a device manufacturing method using an exposure apparatus such as described above, as well as a device as a product of the same are a part of the present invention.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2004-156362 filed May 26, 2004, for which is hereby incorporated by reference.

What is claimed is:

1. A projection optical system, comprising:
   a plurality of mirrors each having a multilayered film,
   wherein a predetermined mirror having a largest light incidence angle range, among said plurality of mirrors, has a multilayered film comprised of alternating Si and Mo layers, the multilayered film including a non-periodic film of Si and Mo layers which are so laminated that thicknesses of pairs of adjacent Si and Mo layers are non-periodic.

2. A projection optical system according to claim 1, wherein said multilayered film is comprised of a laminated structure including an accumulation of said non-periodic film and a periodic film of Si and Mo layers which are so laminated that thicknesses of pairs of adjacent Si and Mo layers are periodic.

3. A projection optical system according to claim 1, wherein a second mirror of said plurality of mirrors, different from said predetermined mirror and having a largest average value of light incidence angle, has a multilayered film comprised of alternating Si and Mo layers, the multilayered film including a non-periodic film of Si and Mo layers which are so laminated that thicknesses of pairs of adjacent Si and Mo layers are non-periodic.

4. A projection optical system according to claim 3, wherein said multilayered film is comprised of a laminated structure including an accumulation of said non-periodic film and a periodic film of Si and Mo layers which are so laminated that thicknesses of pairs of adjacent Si and Mo layers are periodic.

5. A projection optical system according to claim 1, wherein the multilayered films consisting of Si and Mo and with a non-periodic film have a film thickness distribution not less than 1%.

6. A projection optical system according claim 1, wherein light incident on said projection optical system comprises extreme ultraviolet light having a wavelength of 10 to 15 nm.

7. An exposure apparatus, comprising:
   a projection optical system as recited in claim 1;
   a mask; and
   a substrate onto which a pattern of the mask is to be transferred through the projection optical system.

8. A device manufacturing method, comprising the steps of:
   exposing a workpiece by use of an exposure apparatus as recited in claim 7; and
   performing a predetermined process to the workpiece exposed at said exposing step.

9. A projection optical system, comprising:
   a plurality of mirrors each having a multilayered film,
   wherein a predetermined mirror having a largest average value of light incidence angle, among said plurality of mirrors, has a multilayered film comprised of alternating Si and Mo layers, the multilayered film including a non-periodic film of Si and Mo layers which are so laminated that thicknesses of pairs of adjacent Si and Mo layers are non-periodic.

10. A projection optical system according to claim 9, wherein said multilayered film is comprised of a laminated structure including an accumulation of said non-periodic film and a periodic film of Si and Mo layers which are so laminated that thicknesses of pairs of adjacent Si and Mo layers are periodic.

11. A projection optical system according to claim 10, wherein the periodic film is placed upon the non-periodic film.

12. A projection optical system according to claim 2, wherein the periodic film is placed upon the non-periodic film.

13. A projection optical system according to claim 9, wherein the multilayered films consisting of Si and Mo and including a non-periodic film have a film thickness distribution not less than 1%.

14. A projection optical system according claim 9, wherein light incident on said projection optical system comprises extreme ultraviolet light having a wavelength of 10 to 15 nm.

15. An exposure apparatus, comprising:
a projection optical system as recited in claim 9;
a mask; and
a substrate onto which a pattern of the mask is to be transferred through the projection optical system.

16. A device manufacturing method, comprising the steps of:
exposing a workpiece by use of an exposure apparatus as recited in claim 15; and
performing a predetermined process to the workpiece exposed at said exposing step.

* * * * *